(12) United States Patent
Csabi et al.

(10) Patent No.: US 11,604,689 B1
(45) Date of Patent: *Mar. 14, 2023

(54) RESOLVING TECHNOLOGY ISSUES

(71) Applicant: United Services Automobile Association (USAA), San Antonio, TX (US)

(72) Inventors: Rachel Elizabeth Csabi, Frisco, TX (US); Augustine Anthony Honore, San Antonio, TX (US); Melissa Meadows Waldmeier, Helotes, TX (US); Joshua William Trivette, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,832

(22) Filed: Jul. 22, 2021

Related U.S. Application Data

(63) Continuation of application No. 16/178,131, filed on Nov. 1, 2018, now Pat. No. 11,106,524.

(60) Provisional application No. 62/579,999, filed on Nov. 1, 2017.

(51) Int. Cl.
*G06F 11/00* (2006.01)
*G06F 11/07* (2006.01)
(52) U.S. Cl.
CPC ........ *G06F 11/079* (2013.01); *G06F 11/0751* (2013.01); *G06F 11/0787* (2013.01); *G06F 11/0793* (2013.01)

(58) Field of Classification Search
CPC .............. G06F 11/079; G06F 11/0751; G06F 11/0787; G06F 11/0793
See application file for complete search history.

(56) References Cited

U.S. PATENT DOCUMENTS

| | | | |
|---|---|---|---|
| 8,527,814 B1* | 9/2013 | Elwell ................. | G06F 11/0793 717/124 |
| 8,644,813 B1 | 2/2014 | Gailloux et al. | |
| 10,540,223 B1* | 1/2020 | Johansson ........... | G06F 11/0775 |
| 10,802,847 B1* | 10/2020 | Mahapatra .......... | G06F 11/0793 |
| 11,106,524 B1 | 8/2021 | Csabi et al. | |
| 2008/0262860 A1 | 10/2008 | Schneider et al. | |
| 2009/0106224 A1 | 4/2009 | Roulland et al. | |
| 2010/0229112 A1* | 9/2010 | Ergan ................. | G06F 11/0769 715/764 |
| 2013/0218783 A1 | 8/2013 | Anand | |
| 2014/0280068 A1 | 9/2014 | Dhoopar et al. | |

(Continued)

OTHER PUBLICATIONS

Lee, "3 Free Screen Recorders to Capture Your Windows Desktop," Make Use Of, dated Mar. 22, 2016, retrieved from URL <https://www.nnakeuseof.conn/tag/3-free-screen-recorders-capture-windows-desktop/>.

*Primary Examiner* — Joseph D Manoskey
(74) *Attorney, Agent, or Firm* — Fish & Richardson P.C.

(57) ABSTRACT

Methods, systems, and storage media including instructions for resolving technology issues is described. One of the methods includes receiving, by at least one processor, a session record of user producing a technical error on a computer system. The method includes providing, by the at least one processor, the session record for resolution to a processing system. The method also includes providing, by the at least one processor, a potential solution to the technical error.

18 Claims, 7 Drawing Sheets

(56) References Cited

U.S. PATENT DOCUMENTS

| | | |
|---|---|---|
| 2014/0310222 A1 | 10/2014 | Davlos et al. |
| 2016/0134554 A1 | 5/2016 | Deckers |
| 2016/0148014 A1* | 5/2016 | Peterson ............. G06F 21/6245 |
| | | 726/28 |
| 2016/0162475 A1* | 6/2016 | Bondarenko ........... G10L 15/22 |
| | | 704/9 |
| 2017/0169173 A1 | 6/2017 | Snow, Jr. et al. |
| 2017/0372323 A1 | 12/2017 | Stern et al. |
| 2018/0113773 A1 | 4/2018 | Krishnan et al. |
| 2018/0189130 A1 | 7/2018 | Mowry et al. |
| 2018/0329722 A1 | 11/2018 | Nguyen et al. |
| 2019/0050239 A1 | 2/2019 | Caldwell et al. |
| 2021/0081294 A1* | 3/2021 | Golubev ............. G06F 11/3688 |

\* cited by examiner

RESOLVING TECHNOLOGY ISSUES

CROSS-REFERENCE TO RELATED APPLICATIONS

This application is a continuation application of and claims priority under 35 U.S.C. § 120 to U.S. application Ser. No. 16/178,131, filed on Nov. 1, 2018, which claims priority under 35 U.S.C. § 119 to U.S. Application Ser. No. 62/579,999, filed on Nov. 1, 2017, and entitled "Resolving Technology Issues," the entire contents of each of which are incorporated by reference herein.

BACKGROUND

Debugging is the process of finding and resolving of defects that prevent correct operation of computer software or a system.

Debugging tactics can involve interactive debugging, control flow analysis, unit testing, integration testing, log file analysis, monitoring at the application or system level, memory dumps, and profiling. Normally the first step in debugging is to attempt to reproduce the problem. This can be a non-trivial task, for example as with parallel processes or some unusual software bugs. Also, specific user environment and usage history can make it difficult to reproduce the problem.

SUMMARY

Implementations of the present disclosure are related to debugging problems and resolving technical issues In general, innovative aspects of the subject matter described in this specification can be embodied in methods for resolving technical issues. The methods includes the act of instructions for resolving technology issues is described. The methods includes the act of receiving, by at least one processor, a session record of user producing a technical error on a computer system. The method includes the act of providing, by the at least one processor, the session record for resolution to a processing system. The method also includes providing, by the at least one processor, a potential solution to the technical error.

Implementations can optionally include one or more of the following features alone or in combination. The methods may include the act of providing, by at least one processor, the session record as input to at least one computer-processable model that determines, based on the session record, at least one potential solution, the at least one model having been trained, using machine learning and based at least partly on previous sessions records and previously identified solutions, to provide potential solutions. The computer processable model may provide a measure of the likelihood that a potential solution will be successful. The session record may include an audio recording of the user and a recording of actions taken on the computer system. The methods may include the act of removing private user information from the session record. The methods may include the act of generating a transcript of the audio recording.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

A user may encounter problems with their computer that impedes their ability to get work done. These problems may include, but are not limited to, system crashes, bugs, login issues, authorization issues and other similar problems. At the same time, some occupations do not allow for sufficient time to address these problems in a conventional manner. For example, service representatives in a call center are expected to maintain a certain call rate. In these circumstances, users may work around the problem and avoid reporting technical issues due to the amount of time making a report takes away from their other responsibilities.

Figure 1:
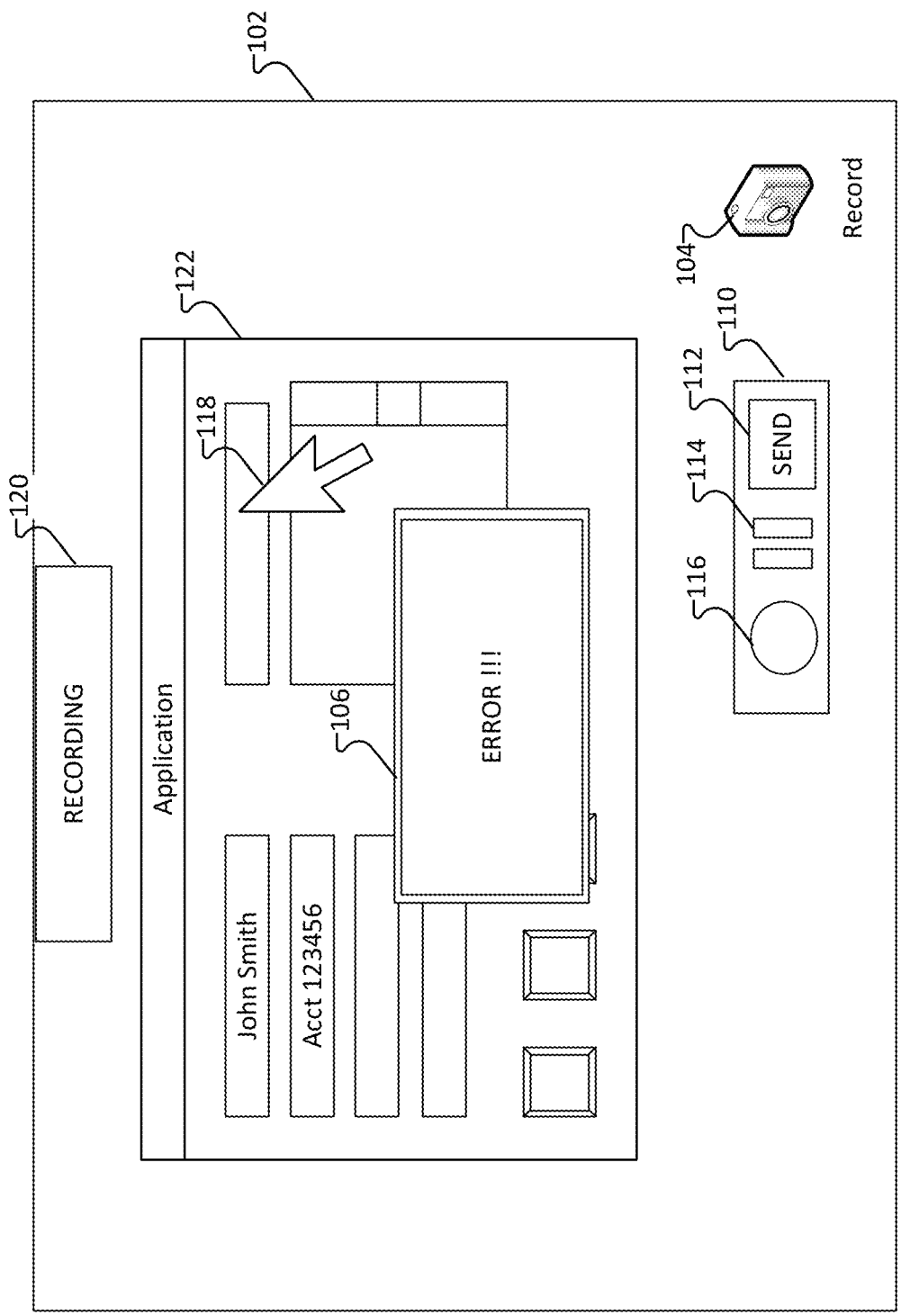
FIG. 1 illustrates an example of a user interface that enables easy reporting of technical issues.

FIG. 1 illustrates an example of a user interface 102 that enables easy reporting of technical issues that occur in an application 122. In order to make the reporting of technical issues easier and more complete, a user interface 102 of a computer may include a record feature 104 that enables the user to record both the actions that they are taking as well as any comments or explanations that the user provides (for example, by speaking into a microphone while performing activities on the computer). For example, when the user encounters an error message 106, the user can press the record application 104 to bring up a recording toolbar 110. In this example, the toolbar 110 includes a record button 116, a pause button 114, and a send button 112. The record button 116 causes the recording feature to start recording. The pause button 114 causes the record feature to temporarily stop recording, the send button 112 causes the record feature to package the information received up until this time and send the error report to an error processing computer system, as described further below. In some implementations, the record feature may include more or fewer options. For example, the record feature may record everything that happens on the computer from the time the record feature is launched until the recording is stopped/sent. In some implementations, the user may be given a notification, such as an overlay message 120 or other indicator that lets the user know that their voice and actions on the computer are being recorded.

In some implementations, the record feature may optionally allow the user to "talk through" the solution. The record feature may generate an audio recording based on the user's discussion.

In some implementations, the record feature may track the actions taken by the user, for example, the mouse movements 118, clicks, keys stuck, and other information. The record feature may also provide a screen shot of the user interface each time the user performs one of a preselected number of actions (such as clicking on a button, entering a value in a field, making a selection, etc. The record feature may also take a screen shot when the record feature launches and when the user selects to send the completed report. In some implementations, the screen shots can be limited to the application the user is interacting with (for example, the screen shots may not show the user's background or other executing application. In some implementations, the recording may also include a list of the processes executing on the computer.

Figure 2:
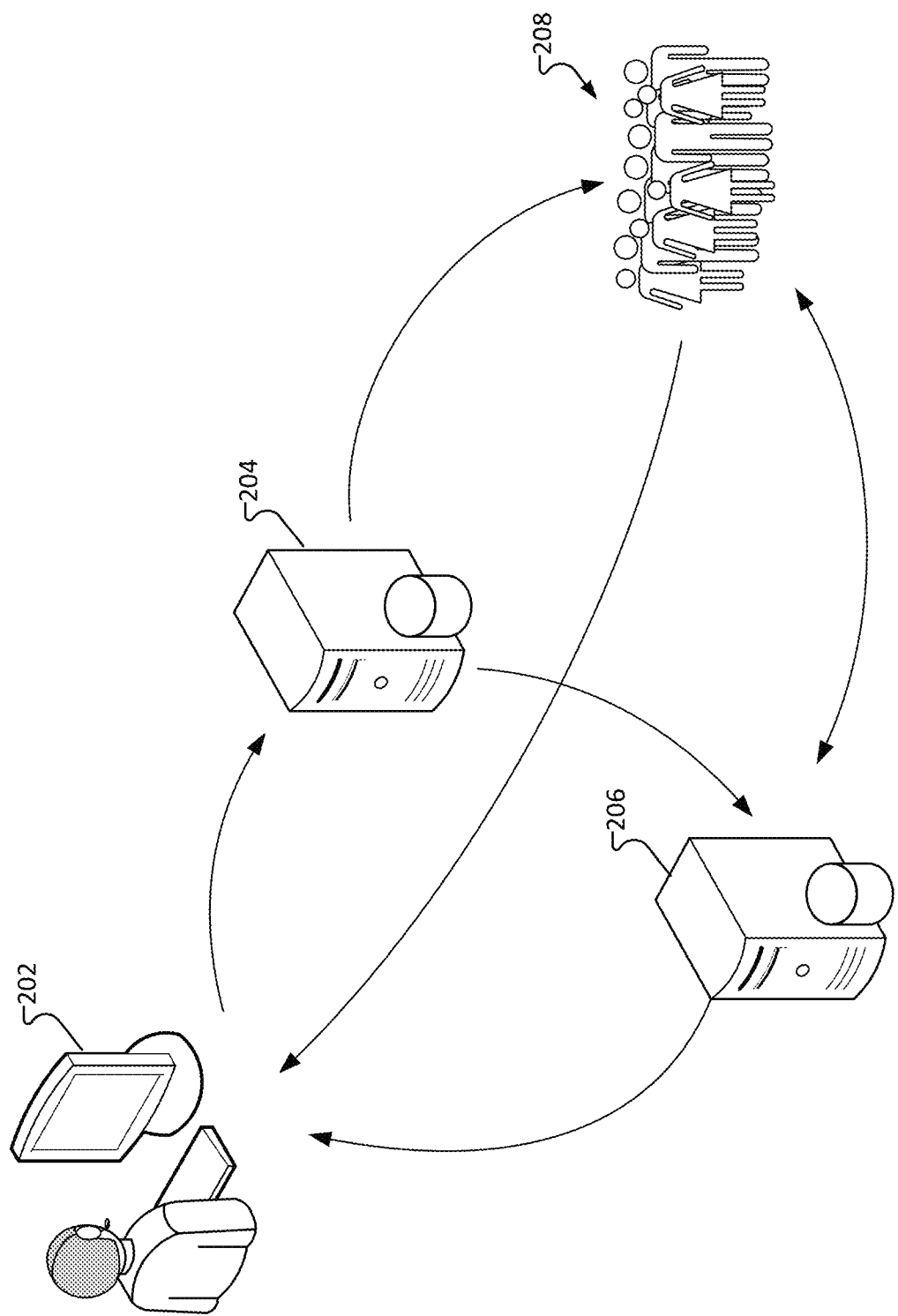
FIG. 2 illustrates an example environment in which the issue reporting system can be used.

FIG. 2 illustrates an example environment in which the issue reporting system can be used. The user may generate a report from a computer system 202. The report may be sent to a report processing system 204. The report processing system 204 may perform operations that are intended to clean up the report and get it ready for further analysis and processing.

The processing can include, for example, removing sensitive information from the report (such as customer identity information, account balances, etc.). The processing can perform other activities, including but not limited to natural language processing, image processing, and data formatting. In some implementations, the processing can include formatting the data for processing by a learning machine 206. The processing can also include formatting the data to be reviewed by an information technology team 208. In some implementations, the processing can include routing the report to an appropriate information technology team out of several different information technology teams.

The learning machine 206 or the information technology group 208 may get back to the user with a solution or potential solution to their problem. Because the report includes a record of the user reproducing the technical issue, it can be substantially easier to find a solution to the problem. In some implementations, the user may be provided with an option as to whether or not they wish to record an audio explanation.

In some implementations, the report may be first sent to the learning machine 206. If the learning machine does not identify a potential solution that meets a threshold likelihood of success (for example, an amount greater than a selected number from 50-100%) then the report may be sent to the technology team 308. If the learning machine does identify a potential solution that meets the threshold the solution may be provided to the user 202.

Figure 3:
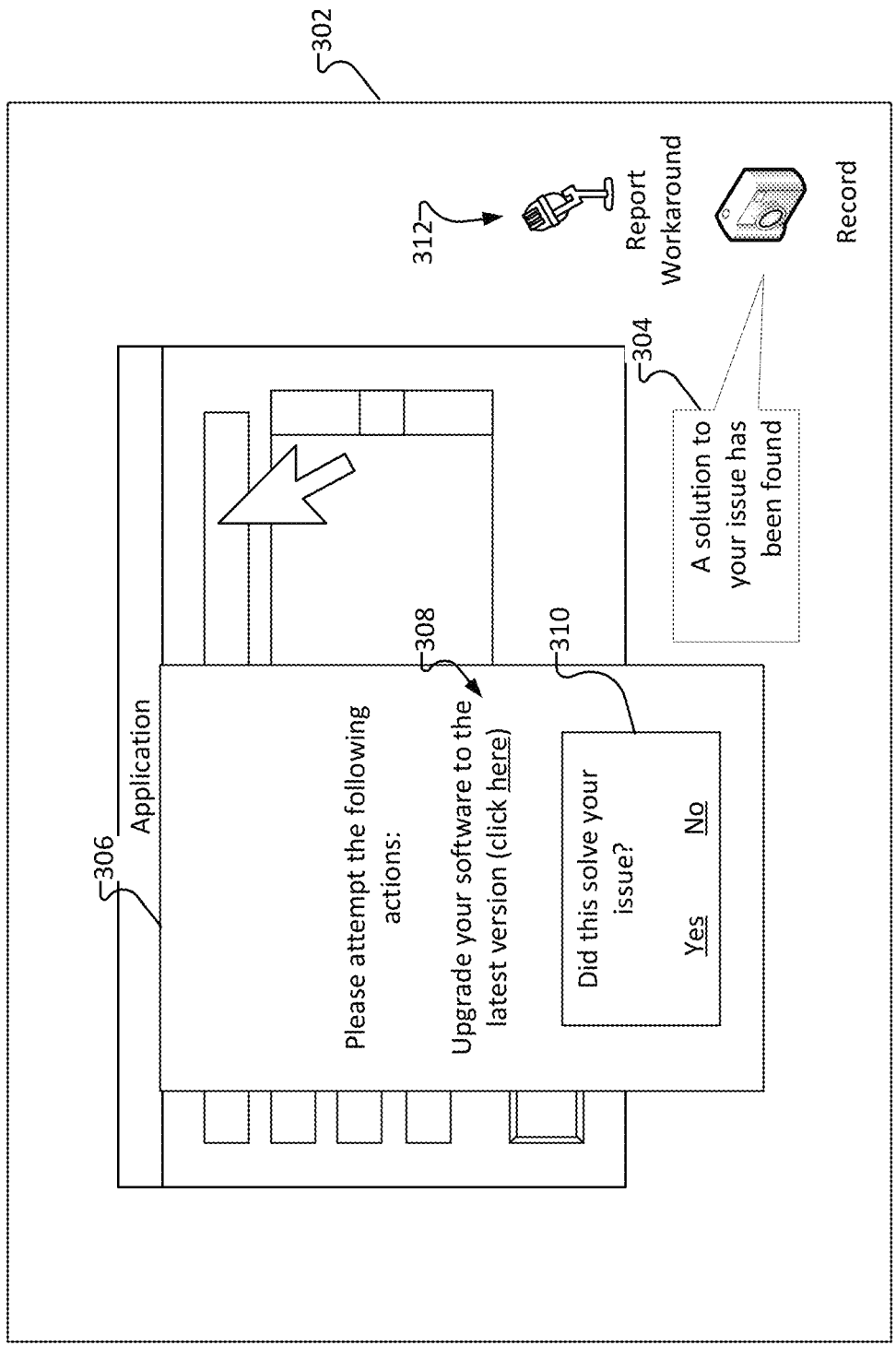
FIG. 3 illustrates an example user interface which demonstrates notifying a user that a solution is being suggested.

FIG. 3 illustrates an example user interface 302 which demonstrates notifying a user that a solution is being suggested. The user may be notified, for example, by the pop up notification 304, that a solution has been found. When the user selects the notification 304, a text 306 or other form of communication may instruct the user how to resolve the problem. In some instances, the problem may have been resolved by the technical team behind the scenes, and the notification may simply notify the user to try again. In other instances, the user may be prompted to take certain actions to resolve the problem. In this example, the user is prompted to upgrade their software and is provided a link 308 to do so automatically. The notification may also include an area where the user can provide feedback as to the efficacy of the solution. In this example, the user is prompted to answer the question as to whether the actions resolved the issue 310. The feedback from the user may be used to refine future suggestions, as discussed further below.

In some implementations, a user with an active report may be provided with an option to explain a work around solution 312. In general, a work around solution does not resolve the core issue, but describes a way that the user was/is able to complete their objectives despite the issue. A work around report may be send to the back end systems and provided to other users who experience similar technical problems while the issue is being resolved.

Figure 4:
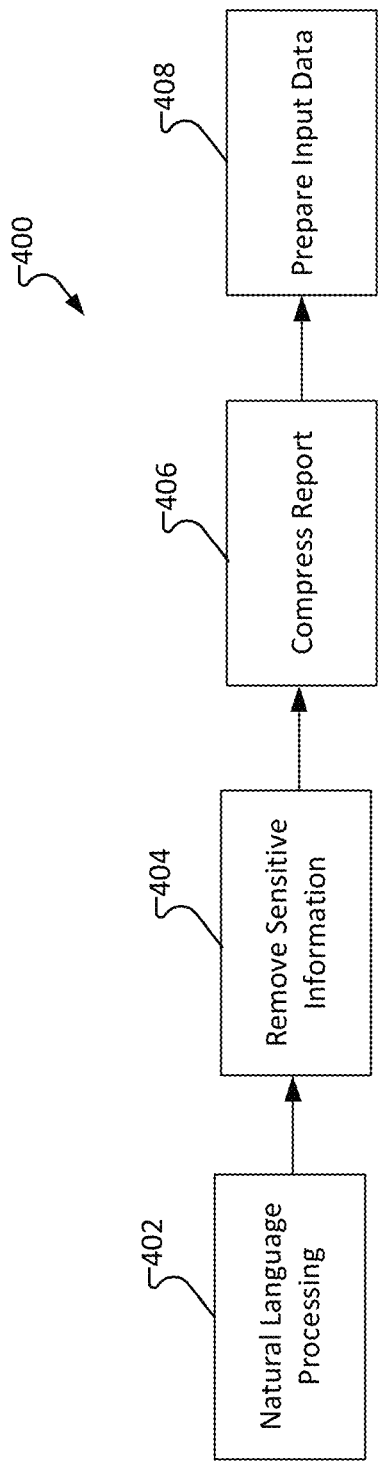
FIG. 4 illustrates an example document processing pipeline.

FIG. 4 illustrates an example document processing pipeline 400. The document processing pipeline 400 includes processes can be performed on the document before the report is provided to a technical team and/or a learning machine. Generally, the processes in the pipeline can be performed in any order. The processes may be performed by a document processing server (for example, the server 204 of FIG. 2), by a user computer (for example, the computer 202 of FIG. 2) or by a combination of different computers.

The document processing pipeline 400 can include a process which performs natural language processing 402 on audio recordings included in the report. In general, natural language processing enables computers to analyze, understand, and derive meaning from human language in a useful way. Natural language processing enables the process to perform tasks such as automatic summarization, translation, named entity recognition, relationship extraction, sentiment analysis, speech recognition, and topic segmentation. The process can generate a transcription of the audio recording. The process can also analyze the audio and/or the transcription in order to determine the nature of the problem. This information can be used, for example, to route the problem to the correct technical team or teams.

The document processing pipeline 400 can include a process to remove sensitive information 404. The process removes selected information from the report, for example, personally identifiable information, account balances and numbers, transaction history amounts, etc.

The document processing pipeline 400 can compress 406 from the report. Compressing the report can include using traditional data compression methods as well as removing extraneous information. For example, the process can remove duplicate screen shots. In general, compression methods that are lossless (that is, that do not degrade the quality of the information included in the report) are preferred.

The document process pipeline 400 can also include preparing input data 408 for a learning machine. For example, a trained learning machine may expect data to be provided in a particular format. The process can structure the data in a manner expected by the learning machine.

In order to expedite resolving technical issues. One or more forms of artificial intelligence, such as machine learning, can be employed such that a computing process or device may learn to resolve technical issues, without being explicitly programmed for the task. Using this training data, machine learning may employ techniques such as regression to estimate responsibility assignment. To produce such estimates, one or more quantities may be defined as a probability of resolution. For example, the characteristics of a solution to a previously submitted similar problem may be characterized as having a high level of success. Whereas, a solution that did not solve the previous problem may be characterized as having a low probability of success. As such, upon being trained, a learning machine may be capable of outputting a numerical value that represents a likelihood of success for a particular problem.

Input to the trained learning machine may take one or more forms. For example, representations of information about the technical problem be provided to the trained learning machine. One type of representation may be visual information (e.g. still images, video, etc.), for example, the visual information can include video/still images capturing during the recording process. Numerical representations describing the problem may also be used as inputs to the training machine, for example, applications involved, mouse movements, keystrokes, etc. Textual representations describing the accident may also be used as inputs to the training machine, for example, the transcription of the audio recording.)

To implement such an environment, one or more machine learning techniques may be employed. For example, supervised learning techniques may be implemented in which training is based on a desired output that is known for an input. Supervised learning can be considered an attempt to map inputs to outputs and then estimate outputs for previously unused inputs. For example, the training data may be supervised training data which includes a probability of success. In some implementations, the indication of probability of success may be partial (for example, a solution may technically solve the problem, but may be otherwise disadvantaged, or may only occasionally solve the problem), for example, the solution could be assigned a percentage score between 0 and 100, 100 indicating that the solution has always worked responsible and 0 indicating that the solution does not work. Other numeric representations and scales may be used.

Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies.

In some arrangements, neural network techniques may be implemented using the data (e.g., vectors of numerical values that represent features of the accident) to invoke training algorithms for automatically learning about the technical issues and related information, such as likelihood of success. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to the training data. By using the training data (e.g., accident information vectors), a function may be defined that quantifies error (e.g., a squared error function used in regression techniques). By minimizing error, a neural network may be developed that is capable of estimating accident responsibility. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implements to reduce its effects.

Figure 5:
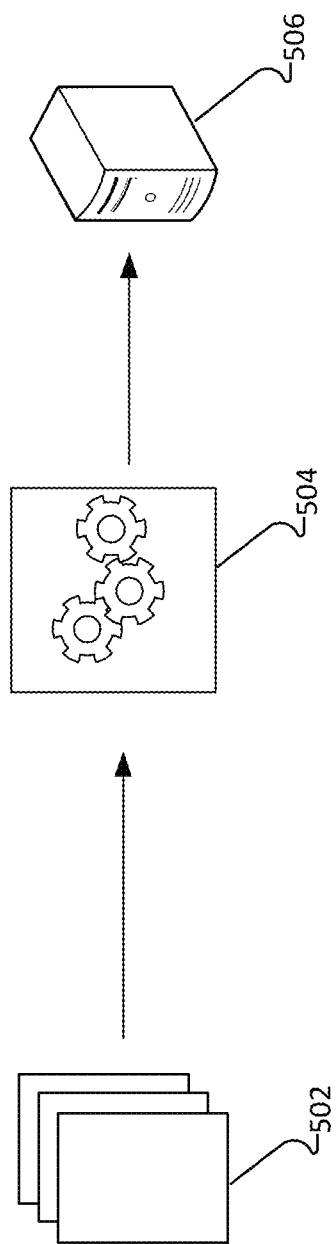
FIG. 5 illustrates an example of training a learning machine.

FIG. 5 illustrates an example of training a learning machine. To train a learning machine (e.g., implemented as a neural network), the service manager includes a learning machine trainer 504 that employs training data 502. In some arrangements, the trainer 504 may calculate numerical representations of technical problem related information (e.g., in vector form) for machine training. Various representations of the accident (e.g., images, text, numerical values, etc.) may be used for computing the accident information.

The learning machine trainer 504 uses the training data 502 and one or more training algorithms to generate a trained learning machine 506. The training data can include, for example, previously submitted reports about technical issues and solutions. The trained learning machine can be used to analyze accident information from previous reports and to select solutions.

In some instances, data generated by the trained learning machine and reviewed, for example, by a human reviewer, can be used to reinforce the trained learning machine 506.

Typically, a series of training cycles are executed to prepare a machine learning system. Once training is complete, the system may be used for determining a solution to a technical problem described in a report. To use such a trained system one or more different types of inputs may be utilized. For example, one or more numerical values may be provided that represent information about the technical issue. In one arrangement, a vector of numerical values that represent the features of a technical issue may be input. Some machine learning systems may be capable of calculating one or more features (e.g., numerical values) for representing technical problem information. For such systems, input data may simply represent one or more characteristics of the technical problem. For example, electronic images of the screen may be provided as input to the system which in turn calculates a vector of technical issue information. Provided the input data, the machine learning system may output a solution and a probability of success.

In some implementations, feedback provided by the user may be used to improve the functioning of the learning machine. For example, a user's feedback about the solution (for example, selecting yes or no 310, in the user interface on FIG. 3) can be used in a reinforcement learning system. In some implementations, a predetermined amount of negative feedback may remove a solution from the list of potential solutions. For example, if five users indicate that a solution did not solve the problem the solution may be removed. In some implementations, a predetermined amount of negative feedback may cause a potential solution to be less likely to be presented to the user (for example, down-voted). In some implementations, a predetermined amount of negative feedback may cause the solution to be flagged for manual review. In practice the predetermined amount of negative feedback may be determined based on a number of users (for example, 3-20) or a percentage of users (for example, 10%-40%). In some implementation, the percentage of users may be determined based on a rolling average, for example, if 10-40% of the users who were provided the potential solution in the last day, week, or month provided negative feedback then the solution is removed.

Figure 6:
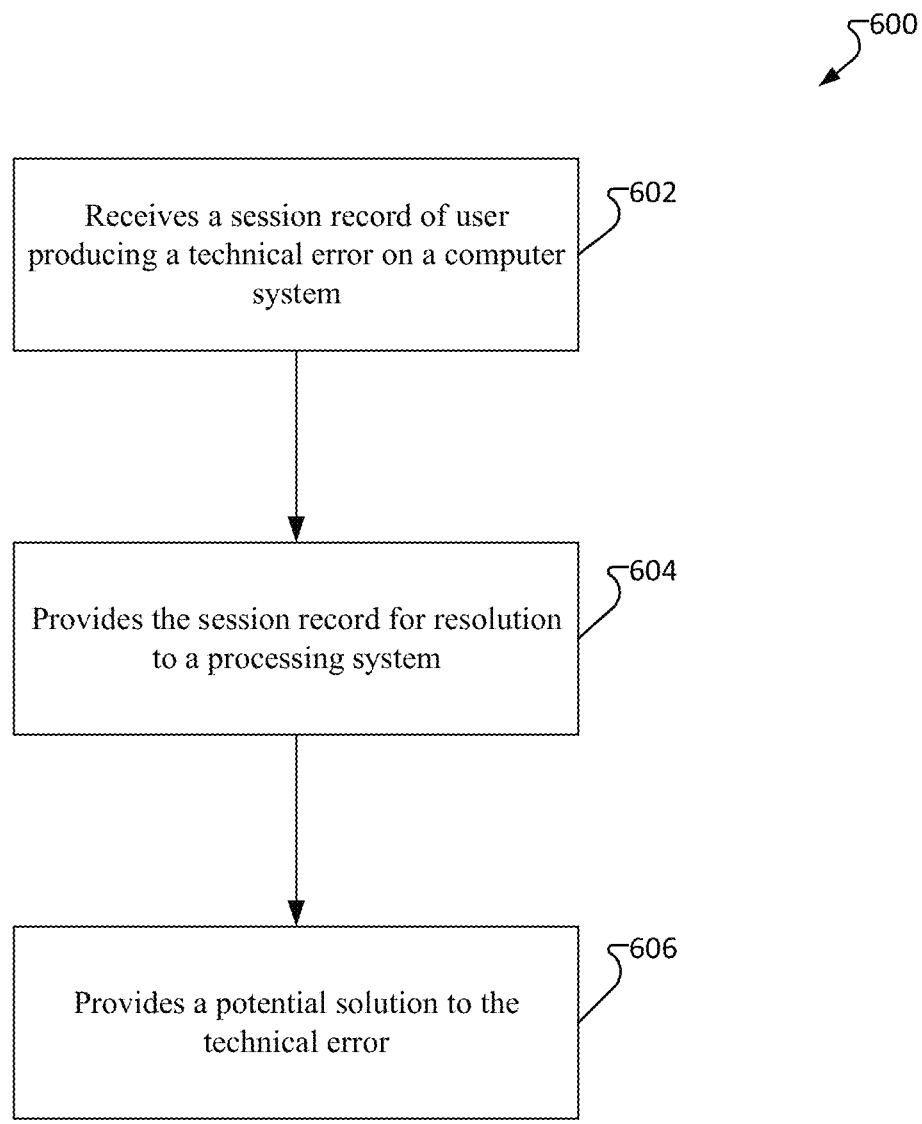
FIG. 6 is a flowchart of an example process for resolving technical issues.

FIG. 6 is a flowchart of an example process for resolving technical issues. The process may be performed by a computer system having one or more processors.

The process 600 receives 602 a session record of user producing a technical error on a computer system.

The process 600 provides 604 the session record for resolution to a processing system. For example, the process may provide the session record as input to one or more models that determine, based on the session record, at least one potential solution, the at least one model having been trained, using machine learning and based at least partly on previous sessions records and previously identified solutions, to provide potential solutions.

The process 600 provides 606 a potential solution to the technical error.

Figure 7:
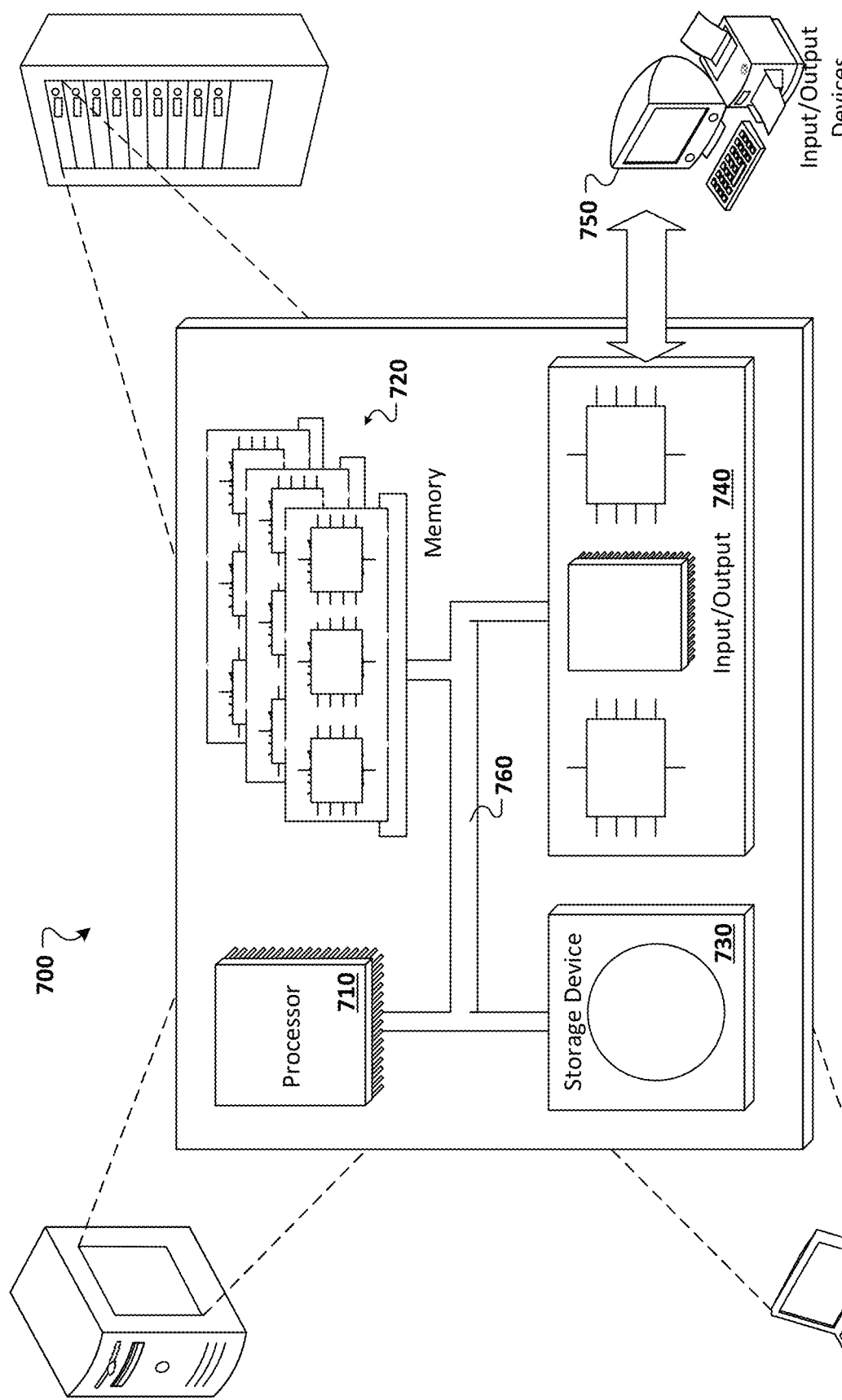
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. The system 700 may include one or more processors 710, a memory 720, one or more storage devices 730, and one or more input/output (I/O) devices 750 controllable through one or more I/O interfaces 740. The various components 710, 720, 730, 740 may be interconnected through at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
receiving, by at least one processor, a session record comprising one or more images of a user interface of a computer system,
wherein at least some of the one or more images represent a technical error on the computer system, and
wherein the one or more images of the user interface are automatically generated by the computer system each time that a user performs any one of a set of operations with respect to the user interface, the set of operations comprising a clicking of a button, an entering of a value in a field, and a making of a selection with respect to the user interface;
providing, by the at least one processor, the session record as input to at least one computer-processable model that determines a potential solution to the technical error based on the session record,
wherein the at least one computer-processable model is trained using machine learning and based at least in part on previous sessions records regarding previous technical errors, and
wherein the previous sessions records represent previously captured images and previously identified solutions to the previous technical errors; and
providing, by the at least one processor, a potential solution to the technical error.

2. The method of claim 1, further comprising:
receiving, by at least one processor from the at least one computer processable model, data presenting a likelihood that the potential solution will be successful.

3. The method of claim 1, further comprising:
detecting, by at least one processor, financial information in the session record; and
removing, by at least one processor, the financial information from the session record.

4. The method of claim 3, wherein the financial information comprises at least one of an account balance, an account number, or a transaction history amount.

5. The method of claim 3, wherein removing the financial information from the session record comprises removing the financial information from the one or more images.

6. The method of claim 1, wherein the session record further comprises one or more videos of the user interface,
wherein the previous session records further include previously captured videos, and
wherein the at least one computer-processable model is trained based at least in part on the previously captured videos.

7. The method of claim 1, wherein the session record further comprises data representing mouse movements with respect to the user interface,
wherein the previous session records further include data representing previous mouse movements, and
wherein the at least one computer-processable model is trained based at least in part on the data representing the previous mouse movements.

8. The method of claim 1, wherein the session record further comprises data representing keystrokes with respect to the user interface,
wherein the previous session records further include data representing previous keystrokes, and
wherein the at least one computer-processable model is trained based at least in part on the data representing the previous keystrokes.

9. One or more non-transitory computer-readable media storing instructions which, when executed by at least one processor, cause the at least one processor to perform operations comprising:
receiving a session record comprising one or more images of a user interface of a computer system,
wherein at least some of the one or more images represent a technical error on the computer system, and
wherein the one or more images of the user interface are automatically generated by the computer system each time that a user performs any one of a set of operations with respect to the user interface, the set of operations comprising a clicking of a button, an entering of a value in a field, and a making of a selection with respect to the user interface;
providing the session record as input to at least one computer-processable model that determines a potential solution to the technical error based on the session record,
wherein the at least one computer-processable model is trained using machine learning and based at least in part on previous sessions records regarding previous technical errors, and
wherein the previous sessions records represent previously captured images and previously identified solutions to the previous technical errors; and
providing a potential solution to the technical error.

10. The one or more non-transitory computer-readable media of claim 9, the operations further comprising:
   receiving, from the at least one computer processable model, data presenting a likelihood that the potential solution will be successful.

11. The one or more non-transitory computer-readable media of claim 9, the operations further comprising:
   detecting financial information in the session record; and
   removing the financial information from the session record.

12. The one or more non-transitory computer-readable media of claim 11, wherein the financial information comprises at least one of an account balance, an account number, or a transaction history amount.

13. The one or more non-transitory computer-readable media of claim 11, wherein removing the financial information from the session record comprises removing the financial information from the one or more images.

14. A system comprising:
   at least one processor; and
   a memory communicatively coupled to the at least one processor, the memory storing instructions which, when executed by the at least one processor, cause the at least one processor to perform operations comprising:
      receiving a session record comprising one or more images of a user interface of a computer system,
         wherein at least some of the one or more images represent a technical error on the computer system, and
         wherein the one or more images of the user interface are automatically generated by the computer system each time that a user performs any one of a set of operations with respect to the user interface, the set of operations comprising a clicking of a button, an entering of a value in a field, and a making of a selection with respect to the user interface;
      providing the session record as input to at least one computer-processable model that determines a potential solution to the technical error based on the session record,
         wherein the at least one computer-processable model is trained using machine learning and based at least in part on previous sessions records regarding previous technical errors, and
         wherein the previous sessions records represent previously captured images and previously identified solutions to the previous technical errors; and
      providing a potential solution to the technical error.

15. The system of claim 14, the operations further comprising:
   receiving, from the at least one computer processable model, data presenting a likelihood that the potential solution will be successful.

16. The system of claim 14, the operations further comprising:
   detecting financial information in the session record; and
   removing the financial information from the session record.

17. The system of claim 16, wherein the financial information comprises at least one of an account balance, an account number, or a transaction history amount.

18. The system of claim 16, wherein removing the financial information from the session record comprises removing the financial information from the one or more images.

* * * * *